(12) United States Patent
Shi et al.

(10) Patent No.: US 10,879,010 B2
(45) Date of Patent: Dec. 29, 2020

(54) ELECTROLYTIC CAPACITOR HAVING A HIGHER CAP RECOVERY AND LOWER ESR

(71) Applicant: KEMET Electronics Corporation, Simpsonville, SC (US)

(72) Inventors: Yaru Shi, Simpsonville, SC (US); Antony P. Chacko, Simpsonville, SC (US); Ajaykumar Bunha, Simpsonville, SC (US); Qingping Chen, Simpsonville, SC (US); Elisabeth Crittendon Key, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 61 days.

(21) Appl. No.: 16/046,154

(22) Filed: Jul. 26, 2018

(65) Prior Publication Data

US 2018/0330888 A1    Nov. 15, 2018

Related U.S. Application Data

(63) Continuation-in-part of application No. 15/595,137, filed on May 15, 2017, now Pat. No. 10,340,091, and (Continued)

(51) Int. Cl.
*H01G 9/15* (2006.01)
*H01G 9/028* (2006.01)
(Continued)

(52) U.S. Cl.
CPC ............. *H01G 9/15* (2013.01); *H01G 9/0036* (2013.01); *H01G 9/028* (2013.01);
(Continued)

(58) Field of Classification Search
CPC ........ H01G 9/15; H01G 9/028; H01G 9/0036; H01G 9/0425; H01G 9/012
See application file for complete search history.

(56) References Cited

U.S. PATENT DOCUMENTS 4,450,049 A * 5/1984 Nakata ................. H01G 9/0032
205/106
7,154,742 B1 * 12/2006 Hahn ..................... H01G 9/048
361/528
(Continued)

FOREIGN PATENT DOCUMENTS

| CN | 102768903 | 11/2012 |
| EP | 1798785 | 6/2007 |
| WO | WO 2012/119711 | 9/2012 |

*Primary Examiner* — David M Sinclair
(74) *Attorney, Agent, or Firm* — Joseph T. Guy; Patent Filing Specialist Inc.

(57) ABSTRACT

Provided is an improved capacitor formed by a process comprising: providing an anode comprising a dielectric thereon wherein the anode comprises a sintered powder wherein the powder has a powder charge of at least 45,000 μFV/g; and forming a first conductive polymer layer encasing at least a portion of the dielectric by applying a first slurry wherein the first slurry comprises a polyanion and a conductive polymer and wherein the polyanion and conductive polymer are in a weight ratio of greater than 3 wherein the conductive polymer and polyanion forms conductive particles with an average particle size of no more than 20 nm.

28 Claims, 5 Drawing Sheets

Related U.S. Application Data a continuation-in-part of application No. 15/379,729, filed on Dec. 15, 2016, now Pat. No. 10,643,796, which is a continuation-in-part of application No. 14/743,195, filed on Jun. 18, 2015, now Pat. No. 9,941,055, which is a continuation-in-part of application No. 13/777,769, filed on Feb. 26, 2013, now Pat. No. 9,312,074.

(60) Provisional application No. 62/338,778, filed on May 19, 2016, provisional application No. 62/267,707, filed on Dec. 15, 2015, provisional application No. 61/603,635, filed on Feb. 27, 2012.

(51) Int. Cl.
- *H01G 9/00* (2006.01)
- *H01G 9/042* (2006.01)
- *H01G 9/08* (2006.01)
- *H01G 11/48* (2013.01)
- *H01G 9/052* (2006.01)
- *H01G 9/012* (2006.01)

(52) U.S. Cl.
CPC ......... *H01G 9/0425* (2013.01); *H01G 9/0525* (2013.01); *H01G 9/08* (2013.01); *H01G 11/48* (2013.01); *H01G 9/012* (2013.01)

(56) References Cited

U.S. PATENT DOCUMENTS

| | | | |
|---|---|---|---|
| D586,767 S | 2/2009 | Guerrero et al. | |
| D599,309 S | 9/2009 | Guerrero et al. | |
| 7,658,986 B2 | 2/2010 | Poltorak et al. | |
| D616,388 S | 5/2010 | Guerrero et al. | |
| 8,313,538 B2 | 11/2012 | Merker et al. | |
| 8,771,381 B2 | 7/2014 | Chen et al. | |
| 8,808,403 B2 | 8/2014 | Qiu | |
| 8,882,856 B2 | 11/2014 | Intelmann et al. | |
| 9,030,807 B2 | 5/2015 | Chacko et al. | |
| 2004/0074779 A1 | 4/2004 | Sotzing | |
| 2005/0248910 A1* | 11/2005 | Merker | H01G 9/028 361/525 |
| 2006/0076541 A1 | 4/2006 | Yoshida | |
| 2006/0226396 A1 | 10/2006 | Majumdar | |
| 2008/0005878 A1 | 1/2008 | Merker | |
| 2008/0139710 A1* | 6/2008 | Tsukada | C08L 101/12 524/100 |
| 2010/0302709 A1 | 12/2010 | Dreissig | |
| 2011/0128675 A1* | 6/2011 | Merker | H01G 9/0036 361/523 |
| 2011/0182002 A1* | 7/2011 | Takahashi | C08L 65/00 361/524 |
| 2012/0057275 A1 | 3/2012 | Intelmann | |
| 2013/0059064 A1 | 3/2013 | Majima et al. | |
| 2014/0022704 A1 | 1/2014 | Petrzilek et al. | |
| 2014/0160632 A1 | 6/2014 | Chacko et al. | |
| 2014/0168857 A1* | 6/2014 | Sautter | H01G 9/028 361/525 |
| 2014/0211372 A1 | 7/2014 | Sugawara | |
| 2014/0211374 A1* | 7/2014 | Sugihara | C08L 65/00 361/527 |
| 2015/0279503 A1 | 10/2015 | Scheel | |
| 2016/0005545 A1 | 1/2016 | Burke | |
| 2016/0079004 A1* | 3/2016 | Freeman | H01G 9/0036 361/509 |

* cited by examiner

ELECTROLYTIC CAPACITOR HAVING A HIGHER CAP RECOVERY AND LOWER ESR

CROSS-REFERENCE TO RELATED APPLICATIONS

This application is a continuation-in-part of pending U.S. patent application Ser. No. 15/379,729 filed Dec. 15, 2016 which, in turn, claims priority to U.S. Pat. Appl. No. 62/267,707 filed Dec. 15, 2015. U.S. patent application Ser. No. 15/379,729 is a continuation-in-part application of U.S. patent application Ser. No. 14/743,195 filed Jun. 18, 2015, now U.S. Pat. No. 9,941,055 issued Apr. 10, 2018, which is, in turn, a continuation-in-part application of U.S. patent application Ser. No. 13/777,769 filed Feb. 26, 2013 now U.S. Pat. No. 9,312,074 issued Apr. 12, 2016, which in turn, claims priority to U.S. Provisional Patent Appl. No. 61/603,635 filed Feb. 26, 2012 all of which are incorporated herein by reference. This application is also a continuation-in-part of pending U.S. patent application Ser. No. 15/595,137 filed May 15, 2017 which claims priority to U.S. Provisional Patent Application No. 62/338,778 filed May 19, 2016 both of which are incorporated herein by reference.

BACKGROUND

The present invention is related to an improved method of forming a solid electrolytic capacitor and an improved capacitor formed thereby. More specifically, the present invention is related to improved conductive polymer slurries and methods for improving capacitance and equivalent series resistance (ESR) of solid electrolytic capacitors using improved conductive polymer slurries.

The construction and manufacture of solid electrolytic capacitors is well documented. In the construction of a solid electrolytic capacitor a, preferably valve, metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as polyaniline, polypyrrole, polythiophene and their derivatives. Solid electrolytic capacitors with intrinsically conductive polymers as the cathode material have been widely used in the electronics industry due to their advantageously low equivalent series resistance (ESR) and "non-burning/non-ignition" failure mode. In the case of conductive polymer cathodes, the conductive polymer is typically applied by either chemical oxidation polymerization, electrochemical oxidation polymerization or spray techniques with other less desirable techniques being reported.

The anode body is typically a porous structure because the porosity increases the surface area which increases capacitance for a given volume. The conductive cathode layer often comprises conductive materials such as the conductive polymer, carbon and silver layers for connection with terminals. It is extremely important for the porous anode surface to be sufficiently covered and in close contact with the conductive cathode layer and it is particularly preferred that the pores be completely impregnated with conductive cathode layer to achieve targeted capacitance. In a manufacturing process to produce conductive polymer-based valve metal capacitors the valve metal powder, such as tantalum, is mechanically pressed into anodes that are subsequently sintered to form porous bodies. The anodes are anodized to a pre-determined voltage in a liquid electrolyte to form a dielectric layer onto which a cathode layer of conductive polymer is formed. The conductive polymer is then coated with graphite and a metal layer followed by assembling and molding into a finished device.

The major drawback of conductive polymer capacitors, regardless of the types of conductive polymers employed, is their relatively low working voltage compared to their $MnO_2$ counterparts. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds to better reliability. For reasons which were previously unknown, the breakdown voltage of capacitors comprising conductive polymers has been limited to about 55V thereby leading to a capacitor which can only be rated for use at about 25V. This limitation has thwarted efforts to use conductive polymers more extensively.

Tantalum capacitors with conductive polymer cathode gained commercial success because of their low ESR and self-heating nature. They are often constructed with at least two polymer layers: an internal polymer layer to fill up pores inside the anode body and an external polymer layer to protect outside dielectric from the subsequently formed carbon and silver layers. The internal conductive polymer layer is in direct contact with most available dielectric surface and is the main factor that affects capacitance. The internal conductive polymer layer can be formed by either in-situ polymerization or by coating with preformed polymer dispersion or solution. The in-situ polymerization approach often yields higher capacitance and lower ESR. However, carrying out chemical reactions on dielectric is a complex process and can damage the dielectric. In addition, residual metal salts from the in-situ polymerization may cause undesirable performance loss such as high leakage and low breakdown voltage. In-situ polymerization is often run for multiple cycles to fill up the pores of anode body. However, the more cycles are run, the more damage it will cause to dielectric, so it is desirable to reduce to number of in-situ polymerization cycles as much as possible and replace it with less harmful processes.

For capacitors used for high voltage applications, the preformed polymer approach is more preferred. Applying preformed polymer reduces leakage and improves breakdown voltage, but with trade-offs. The most successful preformed polymer utilizing PEDOT and polystyrene sulfonic acid (PSSA) as the counterion is a dispersion comprising particles. Depending on the size of the particles, it is often difficult to impregnate all the pores of the anode body, especially if the pores are small, and capacitance suffers with incomplete impregnation. U.S. Pat. No. 8,058,135 teaches conductive polymer dispersion with an average particle diameter of 1-100 nm. Numerous efforts have been made to prepare conductive polymer dispersion with lower average particle sizes or even completely soluble conductive polymer solution, however, these dispersion/solutions often have shelf life issues or are not stable under heat or chemical processing once applied. Existing soluble conductive polymers typically suffer from very low conductivity, which means higher ESR for capacitors.

Preformed conductive polymer often has a much lower conductivity than conductive polymer made via in-situ methods. For example, U.S. Patent No. 9,514,888 teaches a conductivity of the conductive polymer of only 483 S/cm even with DMSO addition. Even with such a high conductivity for a dispersion, the final ESR is still higher than the comparative example using in-situ 3,4-polyethylene dioxythiophene (PEDOT). In-situ PEDOT's conductivity can be as high as thousands of siemens/cm (S/cm). The ESR of polymer-based capacitors is considered directly related to conductivity of the cathode layer and higher conductivity is therefore always desired for the conductive polymer dispersion.

In spite of the extensive research a need exists for materials and methods which improves capacitance and ESR without adversely impacting other aspects such as leakage and BDV. An advancement in the formation of a cathode layer on solid electrolytic capacitors is provided herein.

SUMMARY OF THE INVENTION

It is an object of the invention to provide an improved solid electrolytic capacitor.

It is another object of the invention to provide an improved method for preparing a solid electrolytic cathode capacitor with improved capacitance and ESR.

These and other advantages, as will be realized, are provided a process for forming an electrolytic capacitor comprising:
providing an anode comprising a dielectric thereon wherein the anode comprises a sintered powder wherein the powder has a powder charge of at least 45,000 µFV/g; and forming a first conductive polymer layer encasing at least a portion of the dielectric by applying a first slurry wherein the first slurry comprises a polyanion and a conductive polymer and wherein the polyanion and conductive polymer are in a weight ratio of greater than 3 wherein the conductive polymer and polyanion forms conductive particles with an average particle size of no more than 20 nm.

Yet another embodiment is provided in an electrolytic capacitor. The electrolytic capacitor comprises an anode comprising a dielectric thereon. The anode comprises a sintered powder wherein the powder has a powder charge of at least 45,000 µFV/g. A first conductive polymer layer encases at least a portion of the dielectric wherein the first conductive polymer comprises a polyanion and a conductive polymer. The polyanion and conductive polymer are in a weight ratio of greater than 3 wherein the conductive polymer and polyanion are conductive particles having an average particle size of no more than 20 nm.

FIGURES

DESCRIPTION

The instant invention is specific to a method of making a solid electrolytic capacitor and a solid electrolytic capacitor made thereby. More specifically, the instant invention is specific to a solid electrolytic capacitor with improved capacitance and ESR achieved by the use of a slurry comprising a weight ratio of polyanion to conductive polymer of greater than 3 and particles sizes of no more than 20 nm. The slurry is applied to an anode prepared from a powder having a charge of over 45,000 µFV/g. Surprisingly, the high ratio of polyanion to conductive polymer decreases the conductivity of the slurry which is indicated in the art to be detrimental for electrical properties. The synergistic effect realized with the high charge powder, and small average particle size, provides for improvements in capacitance and ESR which is contrary to expectations in the art.

It now has been found that for a tantalum anode comprising a sintered powder wherein the powder has a specific charge of at least 45,000 µFV/g, better capacitance and ESR could be achieved by using a first slurry comprising conductive polymer and polyanion with a weight ratio of polyanion to conductive polymer of greater than 3 with an average particle size of no more than 20 nm. The improved electrical performance, especially ESR of the capacitor is contrary to expectations in the art since the higher ratio of polyanion is detrimental to conductivity. The art teaches the necessity of lower weight ratios to increase conductivity of the slurry. U.S. Publ. Pat. Appl. 2015/0279503 teaches the importance of utilizing a weight ratio of polyanion to conductive polymer of lower than 2 to improve capacitance. It is now surprisingly realized that with high specific charge, small particle size and increased weight ratio of polyanion to conductive polymer a conductivity of less than 200 S/cm is preferable when utilized with an anode formed from high charge powder which is contrary to expectations in the art.

The invention will be described with reference to the various figures which form an integral non-limiting component of the disclosure. Throughout the disclosure similar elements will be numbered accordingly.

Figure 1:
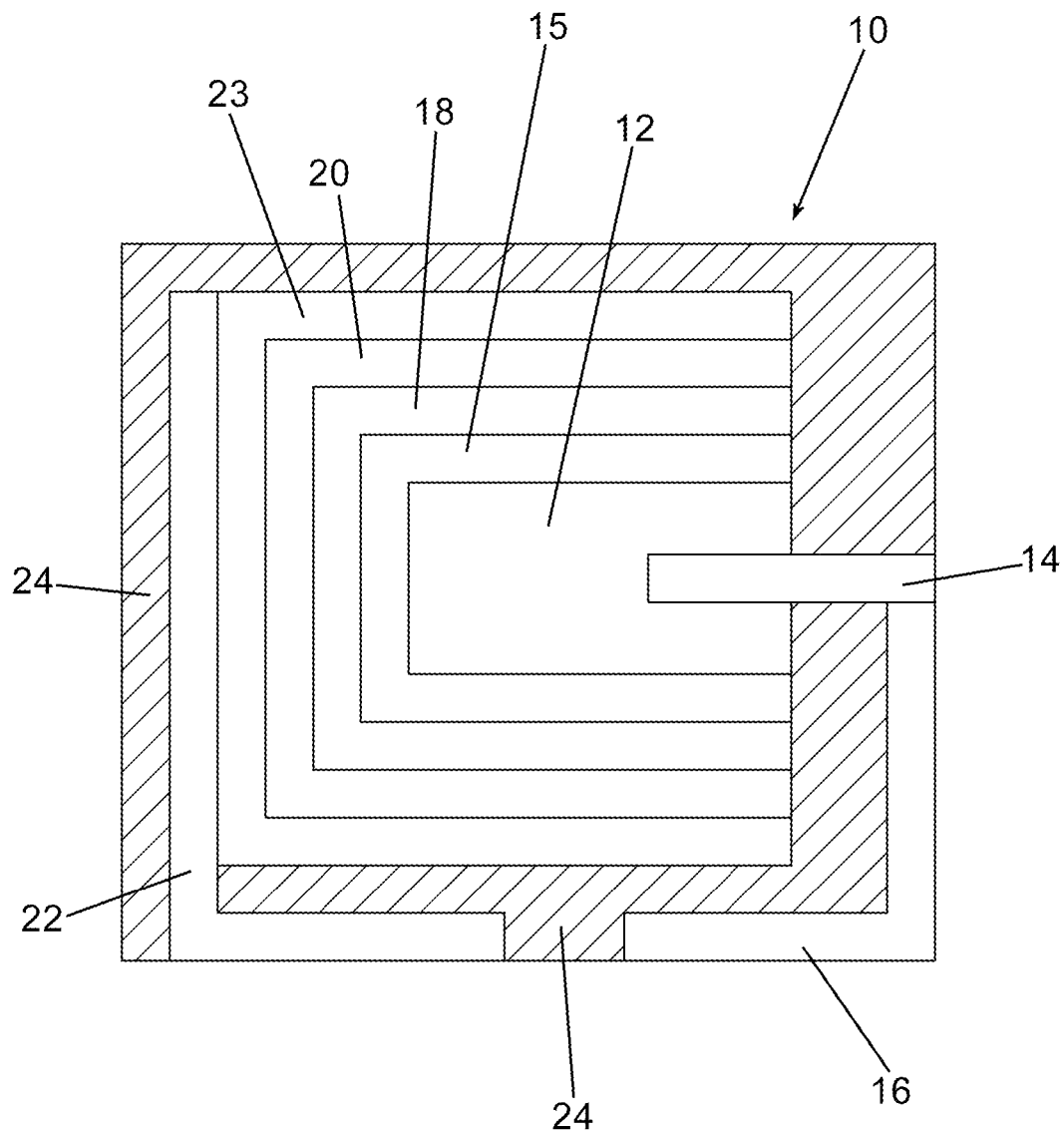
FIG. 1 is a schematic cross-sectional view of an embodiment of the invention.

An embodiment of the invention is illustrated in cross-sectional schematic side view in FIG. 1. In FIG. 1, a capacitor, generally represented at 10, comprises an anodized anode, 12, with an anode lead wire, 14, extending therefrom or attached thereto. The anode lead wire is preferably in electrical contact with an anode lead, 16. An optional, preferably in-situ formed, precursor conductive layer, 15, is formed on the anodized anode and preferably the precursor conductive layer at least partially encases a portion of dielectric of the anodized anode. Alternatively, the precursor conductive layer is formed by coating and curing of a soluble conductive polymer solution. A first conductive polymer layer, 18, and subsequent conductive polymer layer(s), 20, as a cathode layer are formed sequentially on the precursor conductive layer and at least partially encase at least a portion of the first conductive layer and form an encasement around at least a portion of the dielectric. As would be realized to those of skill in the art the cathode and anode are not in direct electrical contact in the finished capacitor. A cathode lead, 22, is in electrical contact with the cathode layers. It is well understood that soldering a lead frame, or external termination, to a polymeric cathode is difficult. It has therefore become standard in the art to provide conductive interlayers, 23, which allow solder adhesion. In many embodiments it is preferred to encase the capacitor in a non-conductive resin, 24, with at least a portion of the anode lead and cathode lead exposed for attachment to a circuit board as would be readily understood by one of skill in the art.

The optional precursor conductive layer comprises a conductive polymer preferably formed by in-situ polymerization or coating and curing of a soluble conductive polymer. An in-situ formed conductive polymer is hypothesized to more effectively enter the interstitial portions of the porous anodized anode thereby forming an improved capacitor. Subsequent layers are formed preferably by dipping into a slurry comprising pre-polymerized conductive polymer with additional additives as will be more specifically set forth herein. A soluble conductive polymer is a conductive polymer that completely dissolves in a solvent or solvent mixture without detectable particles with below about 1 nm being considered below typical particle size detection limits. The solvent for the soluble conductive polymer can be water or organic solvents, or mixture of water with miscible solvents such as alcohol and nonhydroxy polar solvents such as dimethyl sulfoxide (DMSO), dimethylformamide (DMF), dimethylacetamide (DMAc), etc. A conductive polymer solution potentially can impregnate the pores of anodes as effectively as conductive polymers formed by in-situ methods and better than conductive polymer dispersion with detectable particles. Neither in-situ conductive polymer nor soluble conductive polymer contains polyanion dopants such as polystyrene sulfonic acid. In many cases, soluble conductive polymers contain self-doping functionalities. Examples of soluble conductive polymers include conductive polymers of polyanilines, polypyrroles and polythiophenes each of which may be substituted.

Particularly preferred conductive polymers include poly (3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl) methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly (3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

The first conductive polymer layer is formed by applying a first slurry, preferably by dipping, wherein the first slurry comprises a polyanion and a conductive polymer in a weight ratio of polyanion to conductive polymer of greater than 3 to preferably no more than 10. While not limited to theory, it is hypothesized that the polyanion rich first slurry provides enhanced coating and therefore improves ESR of the final capacitor. More preferably the weight ratio is greater than 3 to more than 6. The first conductive polymer layer may be applied from multiple applications of the same slurry. For purposes of this disclosure the first conductive polymer layer is a layer formed by the first slurry and subsequent conductive polymer layers are formed by a second slurry wherein each subsequent layer may have the same composition or a different composition.

The subsequent conductive polymer layers are formed by applying a second slurry, preferably by dipping, wherein the second slurry comprises a polyanion and conductive polymer wherein the weight ratio of polyanion and conductive polymer is not particularly limited. It is preferable that the subsequent conductive polymer layers have a weight ratio of polyanion to conductive polymer which is less than 3. A slurry having a weight ratio of polyanion to conductive polymer of less than 3 has higher conductivity which is preferable for all but the first conductive polymer layer.

Figure 2:
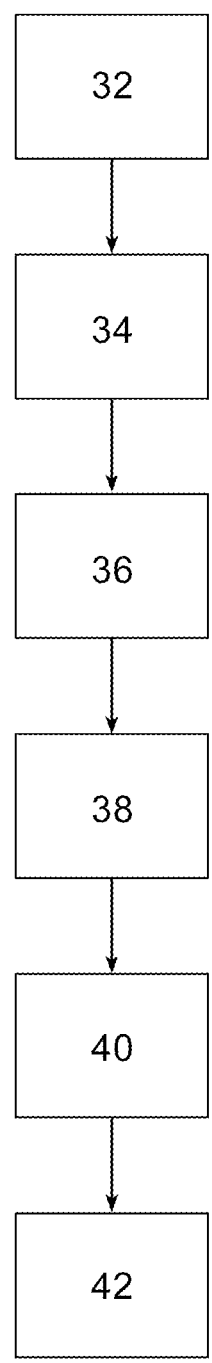
FIG. 2 is a flow chart representation of an embodiment of the invention.

An embodiment of the invention is illustrated in flow chart form in FIG. 2. In FIG. 2, the method of forming a solid electrolytic capacitor of the instant invention is illustrated. In FIG. 2, an anodized anode is provided at 32. An optional precursor conductive polymer layer is formed at 34 wherein the precursor conductive polymer comprises a conductive polymer preferably without polyanion and is preferably formed by in-situ polymerization or by coating and curing of a soluble conductive polymer solution. The first conductive polymer layer may be formed by multiple applications of the first slurry. A first conductive polymer layer is formed on the precursor conductive layer at 36 if present, preferably by dipping into a first slurry, wherein the first slurry is described above. After the first conductive polymer layer is formed, and preferably cured, a subsequent conductive polymer layer is formed on the first conductive polymer layer wherein the subsequent conductive polymer layer comprises polyanion and conductive polymer from a second slurry as defined above. The subsequent conductive polymer layer optionally comprises a crosslinker and particularly an amine crosslinker. The application of additional subsequent polymer layers may be used if desired. It is preferable to apply at least one carbon containing layer and at least one metal containing layer on the final conductive carbon layer, at 40, after which anode and cathode leads are attached to the anode and cathode respectively and the capacitor is optionally, but preferably, encased at 42 and tested. In an embodiment the polyanion is, preferably polystyrenesulfonate.

In an embodiment the polyanion is preferably, a copolymer of polystyrenesulfonate and polystyrene.

In an embodiment the polyanion is a, preferably, random copolymer comprising groups A, B and C represented by the ratio of Formula A:

$$A_xB_yC_z \qquad \text{Formula A}$$

wherein:
A is polystyrenesulfonic acid or salt of polystyrenesulfonate;
B and C separately represent polymerized units substituted with a group selected from:
-carboxyl groups;
—C(O)OR wherein R⁶ is selected from the group consisting of:
   an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$-R$^8$ wherein:
   R$^7$ is selected from a hydrogen or an alkyl of 1 to 7 carbons and preferably hydrogen or methyl;
   b is an integer from 1 to the number sufficient to provide a molecular weight of up to 200,000 for the —CHR$^7$CH$_2$O— group; and
   R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
   R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^1$ wherein:
   R$^{10}$ is selected from:
   a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
   a reactive group selected from the group consisting of hydroxyl, carboxyl, amine, epoxy, silane, imide, amide, thiol, alkene, alkyne, phosphate, azide, acrylate, anhydride and
   —(O(CHR$^{11}$CH$_2$O)$_d$—R$^{12}$ wherein:
   R$^{11}$ is a hydrogen or an alkyl of 1 to 7 carbons and preferably hydrogen or methyl;
   d is an integer from 1 to the number sufficient to provide a molecular weight of up to 200,000 for the —CHR$^{11}$CH$_2$O— group;
   R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
   R$^{13}$ is selected from:
   a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
   a reactive group selected from the group consisting of epoxy, silane, alkene, alkyne, acrylate, phosphate and
   —(CHR$^{14}$CH$_2$O)$_e$—R$^{15}$ wherein:
   R$^{14}$ is a hydrogen or an alkyl of 1 to 7 carbons and preferably hydrogen or methyl;
   e is an integer from 1 to the number sufficient to provide a molecular weight of up to 200,000 for the —CHR$^{14}$CH$_2$O— group; and
   R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride; and
x, y and z, taken together are sufficient to form a polyanion with a molecular weight of at least 100 to no more than 500,000 and y/x is 0.01 to 100; z is 0 to a ratio z/x of no more than 100; more preferably x represents 50-99%, y represents 1 to 50% and z represents 0 to 49% of the sum total of x+y+z; even more preferably x represents 70-90%; y represents 10 to 30% and z represents 0 to 20% of the sum total of x+y+z.

In one embodiment the polyanion functions as a coating aid with insufficient polystyrene sulfonic acid groups to function as an efficient counterion to the conductive polymer. In this instance it is preferable that in the polyanion is represented by Formula A wherein x represents 1-40%, y represents 60 to 99% and z represents 0 to 39% of the sum total of x+y+z; even more preferably x represents 5 to 40%; y represents 60 to 95% and z represents 0 to 35% of the sum total of x+y+z.

Particularly preferred polyanions include:

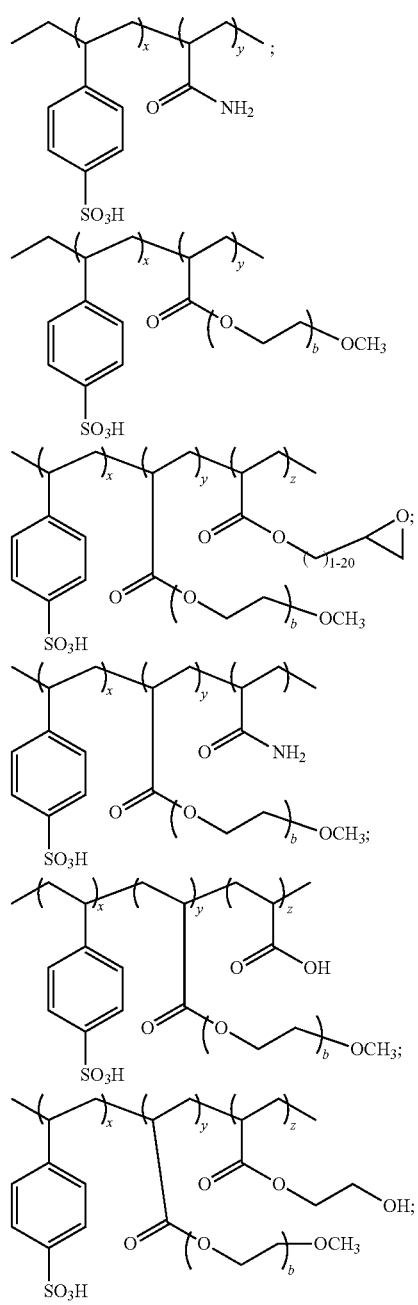

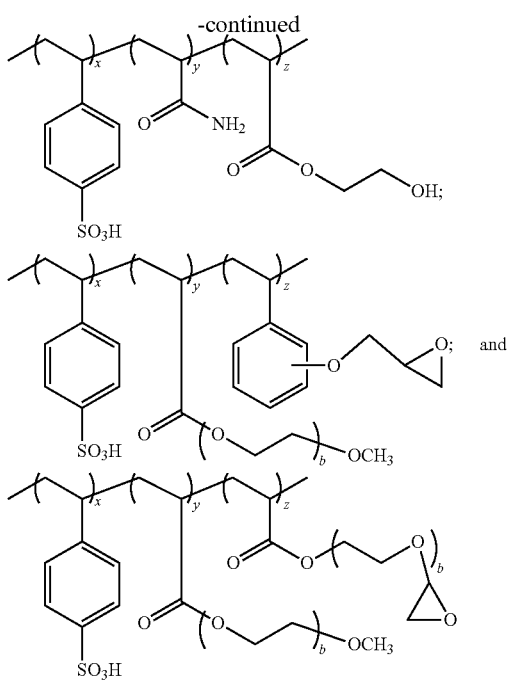

wherein b, x, y and z are as defined above.

The polyanion copolymers are preferably synthesized by a free radical polymerization method. By way of non-limiting example, different ratios of salt of styrene sulfonic acid, to form component A of Formula A, and the appropriate monomers for formation of components B and C of Formula A, are polymerized in the presence of free radical initiator at high temperature preferably ranging from 25° C. to 150° C. and under inert atmospheric condition.

The solvent in which the monomer(s) are to be dissolved is preferably water. A water-soluble solvent may be used, or a mixture of water and a water-soluble solvent may be used. The water-soluble solvent is not particularly limited. Examples of the solvent include acetone, tetrahydrofuran, methanol, ethanol, isopropanol, and N-methyl-2-pyrrolidone.

The polymerization initiator is not particularly limited, and may be, for example, a peroxide, or an azo compound. Examples of the peroxide include ammonium persulfate, potassium persulfate, hydrogen peroxide, cumene hydroperoxide, and di-t-butylperoxide. Examples of the azo compound include 2,2'-azobis(4-methoxy-2,4-dimethylvaleronitrile), 2,2'-azobis(2,4-dimethylvaleronitrile), and 2,2'-azobisisobutyronitrile. The polyanion copolymer can be used directly without further purification in the preparation of conductive polymer dispersion. Moreover, the polyanion copolymer can be purified, preferably by dialysis, precipitation, ultrafiltration or ion exchange method prior to the preparation of conductive polymer dispersion.

The conductive polymer dispersion is preferably prepared in accordance with U.S. Pat. No. 9,030,806 which is incorporated herein by reference. The preferred polymerization method uses a stator screen which provides a uniform droplet size resulting in preferred average polymer particle sizes below about 20 nm.

The inventive conductive polymer dispersion can be prepared by different technologies. Conventional impeller mixing, rotor-stator high shear mixing, ultrasonic mixing, acoustic mixing and other mixing technologies can all be used with their unique advantages. The inventive conductive polymer dispersion is subjected to further processing to reduce its average diameter, preferably to under 20 nm. For example, the dispersion can be further homogenized by different methods such as high-pressure homogenizer, higher shearing homogenizer, ultrasonic devices, acoustic mixer, etc. The dispersion can also be subjected to purification and separation such as dialysis and ultrafiltration to remove non-complexing/non-doping polyanions, separate different average particle sizes and different fractions of the dispersion. These post processing steps can improve capacitance, power cycling capacitance stability, ESR, impedance and other properties.

Conductive polymer dispersions having a lower, and controllable, average particle size can be prepared during polymerization, without additional process steps, when the polymerization is carried out using a rotor stator mixing system with perforated screen stators preferably with hole diameters below about 6 mm. The dispersion may be further processed or homogenized to lower particle size.

The inventive conductive polymer dispersion can also be formulated by mixing with different additives to improve performance. Additives such as silane coupling agents, crosslinking compounds especially epoxy and carboxylic crosslinking compounds, sugar, alcohols, nonionic polyols or ionic liquids can be added into the conductive polymer dispersion or applied as a separate layer after the conductive polymer dispersion. When added as additives in the conductive polymer dispersion, these nonconductive additive molecules may form complexes with the conductive polymer and the conductive polymer complex, or particle, may consist of the extra insulative layer of compound in the conductive polymer particles. Potential benefits of conductive polymer particles consisting of these insulative additives include better adhesion to adjacent layers, better healing of the underlying dielectric layers and lowering the work function of the cathode layer to help capacitance, ESR, leakage, breakdown voltage and anomalous charge behavior. The additives can be added to the conductive polymer dispersion for all the multiple dipping cycles or can be added for some of the dipping cycles.

Though not limited thereto, the present invention is particularly suitable for use in forming conductive polymers of polyanilines, polypyrroles and polythiophenes each of which may be substituted. The preferred monomer for polymerization is shown as polymerized in Formula B:

Formula B

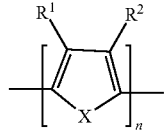

wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C^2$-$C_{18}$ alkoxyalkyl; or are $C^3$-$C^8$ cycloalkyl, phenyl or benzyl which are unsubstituted or substituted by $C_1$-$C^6$ alkyl;

X is S, N or O and most preferable X is S;

$R^1$ and $R^2$ of Formula B are preferably chosen to prohibit polymerization at the β-site of the ring as it is most preferred that only α-site polymerization be allowed to proceed; it is more preferred that $R^1$ and $R^2$ are not hydrogen and more preferably, $R^1$ and $R^2$ are α-directors with ether linkages being preferable over alkyl linkages; it is most preferred that the $R^1$ and $R^2$ are small to avoid steric interferences.

In a particularly preferred embodiment the $R^1$ and $R^2$ of Formula B are taken together to represent —O—(CHR$^4$)$_n$—O— wherein:

n is an integer from 1 to 5 and most preferably 2;

$R^4$ is independently selected from hydrogen; a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —(CHR$^5$)$_a$—R$^{16}$—, —O(CHR$^5$)$_a$R$^{16}$; —CH$_2$O(CHR$^5$)$^a$R$^{16}$; —CH$_2$O(CH$_2$CHR$^5$O)$_a$R$^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, SO$_3$M, anhydride, silane, acrylate and phosphate;

$R^5$ is H or alkyl chain of 1 to 5 carbons optionally substituted with functional groups selected from carboxylic acid, hydroxyl, amine, alkene, thiol, alkyne, azide, epoxy, acrylate and anhydride;

$R^{16}$ is H or SO$_3$M or an alkyl chain of 1 to 5 carbons optionally substituted with functional groups selected from carboxylic acid, hydroxyl, amine, substituted amines, alkene, thiol, alkyne, azide, amide, imide, sulfate, SO$_3$M, amide, epoxy, anhydride, silane, acrylate and phosphate;

a is integer from 0 to 10; and

M is a H or cation preferably selected from ammonia, sodium or potassium.

The conducting polymer is preferably chosen from polypyrroles, polyanilines, polythiophenes and polymers comprising repeating units of Formula B, particularly in combination with organic sulfonates. A particularly preferred polymer is 3,4-polyethylene dioxythiophene (PEDOT).

Particularly preferred conductive polymers include poly (3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl) methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly (3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

Particularly suitable polymers or co-polymers are selected from the group consisting of polypyrrole, polythiophene, poly(4-(2,3-dihydrothieno-[3,4-b][1,4]dioxin-2-yl) methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly (3-methylthiophene), poly(3-methoxythiophene), and poly (3,4-ethylenedioxythiophene).

The polyanion copolymer of Formula A can be used as a counterion to polythiophene comprising repeating units of Formula B. The preferred molecular weight of polyanion is at least about 100 to no more than about 500,000. Below a molecular weight of about 100 film integrity can be affected and above a molecular weight of about 500,000 conductivity and viscosity can be adversely affected.

The viscosity of each polymer dispersion after polymerization and before homogenization is preferably at least 200 cP at 20 RPM to no more than 4000 cP at 20 RPM at ambient temperature and preferably at least 600 cP at 20 RPM to no more than 2000 cP at 20 RPM at ambient temperature. The dispersion has a preferred percent solids of 1 wt % to no more than 5 wt %. More preferably, the polymer dispersion has a percent solids of at least 2 wt % to no more than 3.5 wt %. The viscosity of the inventive polymer dispersion after homogenization is preferably less than 100 cPs at 100 RPM, and more preferably less than 50 cPs at 100 RPM.

The dispersion, and polymerization preferably occurs at a temperature of at least about 15° C. to no more than about 35° C. Below a temperature of about 15° C. the polymerization rate is very slow and above about 35° C. conductivity and viscosity can be adversely affected.

The first or second conductive polymer dispersions comprising conductive polymer and polyanion can be further stabilized by polymeric steric stabilizers during or post polymerization. Coagulation or gel formation is significantly reduced due to the insensitivity of the sterically stabilized system to the fluctuations and increases in electrolyte concentration. In addition, high solids dispersions can be produced by this method due to the higher stabilizing effect of steric stabilizers.

A criteria for polymeric steric stabilizers for conductive polymer dispersion polymerization is that they must be stable during low pH polymerization conditions, stable to oxidizing agents, and that they do not interfere with polymerization of the monomer. An exemplary steric stabilizer is a high molecular weight polyethylene oxide and their copolymers which are preferred as the steric stabilizer due to their stability in low pH reaction conditions. Another exemplary steric stabilizer is polydimethyl siloxane-polyethylene oxide (PDMS-PEO) block copolymer. An advantage of the PDMS-PEO copolymer is that the PDMS block could provide moisture resistance in addition to steric stabilization.

Particularly preferred polymeric steric stabilizers comprise linking groups which, upon formation of a coated layer, crosslink thereby providing an interlinked matrix which functions as a binder thereby providing a coated layer with a suitable structural integrity. Steric stabilizers with a reactive functionality can be employed for post polymerization crosslinking with the polyanion. Any reactive steric stabilizer with a reactive functionality which is stable during the polymerization reaction can be used. Examples of such reactive stabilizers are hydroxyl and dihydroxy end capped polybutadiene. Precursors of reactive steric stabilizer can also be employed for post polymerization activation of the steric stabilizer reactive group. Steric stabilizers are preferably added to the polymerization reaction as solutions in water or other polar solvents such as dimethyl sulfoxide, ethylene glycol, N-methyl pyrrolidone, etc.

As used herein, the terminology "steric stabilizer" refers to compounds which are adsorbed to the polymer particles of the dispersion and protective layers around the respective particles to prevent agglomeration of the particles.

Suitable steric stabilizers include, for example, protective colloids and nonionic surfactants having a hydrophilic/lipophilic balance (HLB) greater than about 10. Hydrophilic/lipophilic balance is a measure of the degree to which a material is hydrophilic or lipophilic.

Suitable protective colloids include polyethylene oxide, fully hydrolyzed polyvinyl alcohol, partially hydrolyzed poly(vinyl alcohol), poly(vinyl pyrollidone), hydroxyethyl cellulose, polyethylene oxide copolymers and their derivatives, and mixtures thereof. Polyethylene oxide is preferred.

The first or subsequent conductive polymer layers may independently comprise substances such as surface-active substances, for example ionic and/or nonionic surfactants; Suitable nonionic surfactants include ethoxylated alkyl phenols, ethoxylated acetylenic diols, polyethylene oxide-propylene oxide block copolymers as well as mixtures thereof.

The first or second conductive polymer slurry may further comprise crosslinkers. Cross-linking comprises the use of a material comprising at least two cross-linkable functionalities wherein one cross-linkable functionality forms a first bond and the second cross-linkable functionality forms a second bond thereby forming a bridge of cross-linking molecule between two portions of polymer. The cross-linkable functionality may form a covalent bond or an ionic bond. The cross-linking provides a process for improved ESR stability by providing a molecule, oligomer, or polymer with crosslinkable functionality in a layer and across layers thereby improving the layer integrity and the surface coverage. Once exposed to curing conditions, which is typically thermal curing, the crosslinkable molecules react thus forming a strongly bound interpenetrating network of covalent and ionic bonds. The reaction of the crosslinkable functionality and the crosslinker occurs at elevated temperature which occurs during the normal processing steps of capacitor manufacture.

The crosslinkable materials preferably comprise two components with one component preferably being a compound, oligomer or polymer with multifunctional or multiple reactive groups. The second component is preferably a molecule with crosslinkable functionality preferably selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts.

One embodiment includes a solid electrolytic capacitor comprising a crosslinkable material system wherein an oligomer or polymer comprises multifunctional reactive groups selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, particles with surface functional groups can also take part in the crosslinking. Particles with functional groups are preferred wherein the functional groups are selected from carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts. Particles can be nanoparticles or microparticles. One example of functionalized nanoparticles is organomodified nanoclay.

In an embodiment at least one conductive layer further comprises organic or inorganic particles or fibers with reactive functional groups or carbon particle filled polymer, a metal particle filled polymer and a conductive particle filled polymer or particles of fibers with reactive functional groups or crosslinkable groups.

The first or subsequent conductive polymer layers may independently comprise additives which enhance the conductivity, for example compounds containing ether groups, for example tetrahydrofuran; compounds containing lactone groups, such as y-butyrolactone, r-valerolactone; compounds containing amide or lactam groups, such as caprolactam, N-methylcaprolactam, N,N-dimethylacetamide, N-methyl-acetamide, N,N-dimethylformamide (DMF), N-methyl-formamide, N-methylformanilide, N-methylpyrrolidone (NMP), N-octylpyrrolidone, pyrrolidone; sulfones and sulfoxides, for example sulfolane(tetramethylenesulfone), dimethyl sulfoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di-or polyalcohols, for example ethylene glycol, glycerol or di-or triethylene glycol. Preference is given to using, as conductivity-enhancing additives, ethylene glycol, dimethyl sulfoxide, glycerol or sorbitol.

The first or second slurry preferably comprises reactive monomers, which may function as film formers, can improve polymer film strength upon drying of the film. The reactive monomer or oligomers can be soluble in water or organic solvent or disperse in water through the use of ionic/non-ionic surfactant. The reactive monomers can have average functionalities of at least two and preferably more. The curing process of the monomer can be catalyzed by using heat, radiation or chemical catalysis. Examples of monomers such as compounds having more than one epoxy group includes ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyociane, 1,2,5,6-diepoxycycloociane, 4-vinyl cyclohexane diepoxide, bisphenol A diglycidyl ether, maleimide-epoxy compounds, diglycidyl ether, glycidyl acrylate, glycidyl methacrylate, waterborne dispersion of epoxy resins such as bisphenol A epoxy resin, epoxidized Bisphenol A novolac modified epoxy resin, urethane modified Bisphenol A epoxy resin, an epoxidized o-cresylic novolac resin and so forth.

Examples of other suitable monomers containing acidic groups, i.e. oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, irimesic acid, polyacrylic acid, etc. Particularly preferred organic acids are aromatic acid such as phthalic acid, and particularly ortho-phthalic acid.

Examples of suitable monomers containing alcohol/acrylate groups, such as, diethylene glycol, pentaerythritol, triethylene glycol, oligo/polyethylene glycol, triethylene glycol monochlorohydrin, diethylene glycol monochlorohydrin, oligo ethylene glycol monochlorohydrin, triethylene glycol monobromohydrin, diethylene glycol monobromohydrin, oligo ethylene glycol monobromohydrin, polyethylene glycol, polyether, polyethylene oxide, triethylene glycol-dimethylether, tetraethylene glycol-dimethylether, diethylene glycol-dimethylether, diethylene glycol-diethylether-diethylene glycol-dibutylether, dipropylene glycol, tripropylene glycol, polypropylene glycol, polypropylene dioxide, polyoxyethylene alkylether, polyoxyethylene glycerin fatty acid ester, polyoxyethylene fatly acid amide, 2-hydroxyethyl methacrylate, 2-hydroxypropyl methacrylate, n-butoxyethyl methacrylate, n-butoxyethylene glycol methacrylate, methoxytriethylene glycol methacrylate, methoxypolyethylene glycol methacrylate, 2-hydroxyethyl acrylate, 2-hydroxypropyl acrylate, n-butoxyethyl acrylate, n-butoxyethylene glycol acrylate, methoxytriethylene glycol acrylate, ethoxypolyethylene glycol acrylate, and the like; bifunctional (meth)acrylate compounds, such as, ethylene glycol di(meth)acrylate, diethylene glycol di(meth)acrylate, triethylene glycol di(meth)acrylate, polyethylene glycol di(meth)acrylate, neopentyl glycol di(meth)acrylate, glycerin di(meth)acrylate, and the like; glycidyl ethers, such as, ethylene glycol diglycidyl ether, glycidyl ether, diethylene glycol diglycidyl ether, triethylene glycol diglycidyl ether, polyethylene glycol diglycidyl ether, propylene glycidyl ether, tripropylene glycidyl ether, polypropylene glycidyl ether, glycerin diglycidyl ether, and the like; glycidyl methacrylate, trimethylolpropane triacrylate, ethylene oxide-modified trimethylolpropane triacrylate, ethylene oxide-modified pentaerythritol triacrylate, ethylene oxide-modified pentaerythritol tetraacrylate, and the like.

The first or subsequent conductive polymer layers may also independently comprise polyanions containing reactive groups such as epoxy, alcohol, silanes, phosphates, amine, alkene, thiol, alkyne, azide carboxylic acid.

The first or subsequent conductive polymer layers may also independently comprise linear hyperbranched polymers disclosed in patent U.S. Pat. No. 9,378,898. The first or subsequent conductive polymer layers may comprise a linear-hyperbranched polymer where the linear block has at least two reactive end functional groups selected from hydroxyl groups, amino groups, epoxy, acrylate, acid etc. and where the hyper-branched block comprises polyether-epoxy, polyester-epoxy, polyester-silanol, polyester-acid, polyether-alcohol, polyamide-acid, polyether-acrylate, polyether-silanol and polyester-amine pendant groups.

The first or subsequent conductive polymer layers may further independently comprise work function modifiers disclosed in U.S. Publ. No. 20150348715 A1. Examples of work function modifiers such as organotitanates derivatives selected from the group consisting of di-alkoxy acyl titanate, tri-alkoxy acyl titanate, alkoxy triacyl titantate, alkoxy titantate, neoalkoxy titanate, titanium IV 2,2(bis 2-propenolatomethyl)butanolato, tris neodecanoato-O; titanium IV 2,2(bis 2-propenolatomethyl)butanolato, iris(dodecyl) benzenesulfonato-O; titanium IV 2,2(bis 2-propenolatomethyl)butanolato, tris(dioctyl)phosphato-O; titanium IV 2,2(bis 2-propenolatomethyl) tris(dioctyl)pyrophosphatobutanolato-O; titanium IV 2,2(bis 2-propenolatomethyl) butanolato, tris(2-ethylenediamino)ethylato; and titanium IV 2,2(bis 2-propenolatomethyl)butanolato, tris(3-amino)phenylato being representative neoalkoxy titanates and derivatives thereof. Furthermore, work function modifier can be a compounds consisting of cycloaliphatic epoxy resin, ethylene glycol diglycidyl ether, bisphenol A epoxy resin, bisphenol F epoxy resin, bisphenol S epoxy resin, novolac epoxy resin, aliphatic epoxy resin, Glycidylamine epoxy resin, ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, and derivatives thereof.

The first or subsequent conductive polymer layers may further independently comprise nonionic polymer such as a hydroxy-functional nonionic polymer. The term "hydroxy-functional" generally means that the compound contains at least one hydroxyl functional group. The molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans). The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned.

In addition to those noted above, other hydroxy-functional nonionic polymers may also be employed. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10-16}$—$(O$—$C_2H_4)_{1-25}$—$OH$ (e.g., octaethylene glycol monododecyl ether and pentaethylene glycol monododecyl ether); polyoxypropylene glycol alkyl ethers having the general formula: $CH_3$—$(CH_2)_{10-16}$—$(O$—$C_3H_6)_{1-25}$—$OH$; polyoxyethylene glycol octylphenol ethers having the following general formula: $C_8$—$H_{17}$—$(C_6H_4)$—$(O$—$C_2H_4)_{1-25}$—$OH$ (e.g., Triton™ X-100); polyoxyethylene glycol alkylphenol ethers having the following general formula: $C_9$—$H_{19}$—$(C_6H_4)$—$(O$—$C_2H_4)_{1-25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and so forth.

The first or second slurry can comprise ionic liquids including poly(ionic liquids) (PILs). Ionic liquids can also be applied as a separate layer before or after the conductive polymer dispersion. Ionic liquids (ILs) are generally defined as organic/inorganic salts with a melting point lower than 100° C. which present a good chemical and electrochemical stability, low flammability, negligible vapor pressure and high ionic conductivity. In a liquid state and with negligible vapor pressure, ionic liquids are commonly considered as green solvents for industrial production. Ionic liquids are organic salts in which the ions are poorly coordinated and melt below 100° C., or even at room temperature. Ionic liquids have a wide electrochemical operational window and comparably high matrix mobility at room temperature. Because ionic liquids are entirely composed of ions, their charge density is much higher than that of an ordinary salt solution. For applications in capacitors, due to the unique charged structure of the ionic liquids, they may form complex with conductive polymers that also have charged cations and anions and this may affect the impregnation behavior of the conductive polymer particles. Ionic liquids could also affect healing of dielectric under electrical field and therefore benefit leakage and breakdown voltage of capacitors. Ionic liquids are composed of the cationic component and the anionic component. Examples of cationic component include: ammonium, imidazolinium, pyridinium, pyrrolidinium, pyrrolinium, pyrazinium, pyrimidinium, triazonium, triazinium, triazine, quinolinium, isoquinolinium, indolinium, quinoxalinium, piperazinium, oxazolinium, thiazolinium, morpholinium, piperazine, sulfonium and their derivatives. The cations can be substituted with functional groups such as aliphatic, alicyclic or aromatic hydrocarbons, hydroxy, amino, carboxylic acids, ester, ether, acyl, and acryl functional groups. the cation component is preferably an ammonium or imidazolium. Examples of the anionic component include fluorine-containing anions such as $BF_4^-$, $PF_6^-$, $CF_3BF_3^-$, $C_2F_5BF_3^-$, $CH_2CHBF_3^-$, $nC_3H_7BF_3^-$, $nC_4H_9BF_3^-$, $CF_3CO_2^-$, $CF_3SO_3^-$, $CHF_2CF_2CF_2CF_2CH_2OSO_3^-$, $CHF_2CF_2CF_2CF_2CH_2SO_3^-$, $(CF_3SO_2)_2N^-$, $(CF_3SO_2)_3C^-$, $(COCF_3)(SO_2CF_3)N^-$, and non-fluorine-containing anions such as $B(CN)_4^-$, $N(CN)_2^-$, $C(CN)_3^-$, $SCN^-$, $SeCN^-$, $AlCl_4^-$, $OH^-$, $CH_3SO_3^-$, $CH_3OSO_3^-$, $(CH_3CH_2)PO_4^-$, and their derivatives.

Poly(ionic liquids)s (PILs), refer to a subclass of polyelectrolytes that feature an ionic liquid species in each monomer repeating unit, connected through a polymeric backbone to form a macromolecular architecture as set forth in *Progress in Polymer Science* Volume 38, Issue 7, July 2013, Pages 1009-1036. Some of the unique properties of ionic liquids are incorporated into the polymer chains, giving rise to a new class of polymeric materials. Polymeric ionic liquids expand the properties and applications of ionic liquids and common polyelectrolytes. Due to the solvent-independent ionization state of the ionic liquid species, polymeric ionic liquids are permanent and strong polyelectrolytes. The characteristic feature of absorbing water is a common feature of ionic liquids and polymeric ionic liquids.

Exemplary polymeric ionic liquids are selected from the group consisting of:

Cationic PILs

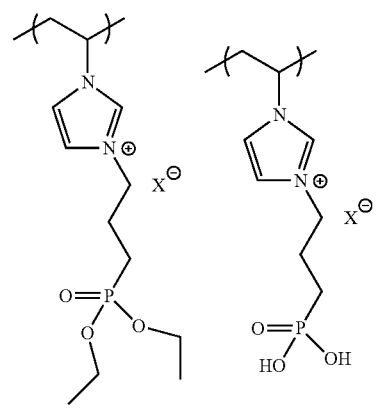

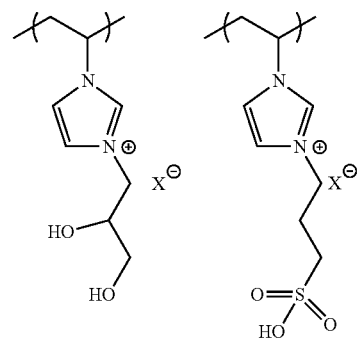

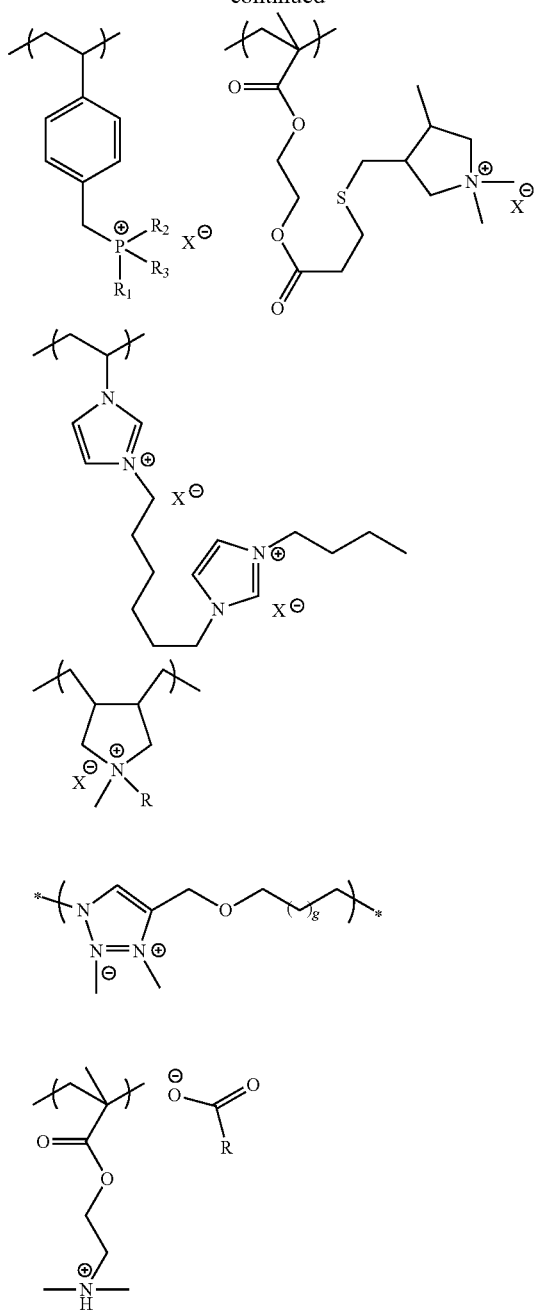

Anionic PILs

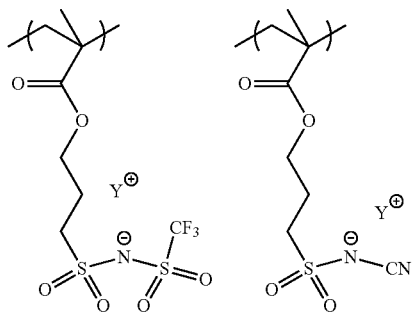

n = alkyl chains 1-ethyl-3-methylimidazolium tetrafluoroborate and derivatives thereof.

The first or second slurry may have a pH of 1 to 14, preference being given to a pH of 1 to 10, particularly preferred is a pH of 1 to 8 with the pH being measured at 25° C. To adjust the pH, bases or acids, for example, can be added to the solutions or dispersions. The bases used may be inorganic bases, for example sodium hydroxide, potassium hydroxide, calcium hydroxide or ammonia, or organic bases, for example ethylarnine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methyl-propylamine, methylethylamine, bis(1-methyl)propylamine, 1,1-di-methylethylamine, pentylamine, dipentylamine, tiripentylamine, 2-pentylamine, 3-pentylamine, 2-methyl-butylamine, 3-methylbutylamine, bis(3-methyl-butylamine), tris(3-methylbutylamine), hexylamine, octylamine, 2-ethylhexylamine, decylamine, N-methyl-butylamine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyl-diethanolamine, dimethylethanolamine, diethyl-ethanolamine, N-butylethanolamine, N-butyldiethanol-amine, dibutylethanolamine, cyclohexylethanolamine, cyclohexyldiethanolamine, N-ethylethanolamine, N-propylethanolamine, tert-butylethanolamine, tert-butyl-diethanolamine, propanolamine, dipropanolamine, tripropanolamine or benzylamine, bi-, tri-, or tetra-functional amines. The acids used may be inorganic acids, for example sulfuric acid, phosphoric acid or nitric acid, or organic acids, for example carboxylic or sulfonic acids.

The anode material is not limited herein. The anode is a conductor preferably selected from a metal or a conductive metal oxide. A particularly preferred anode material is a metal and a particularly preferred metal is a valve metal or a conductive oxide of a valve metal. More preferably the anode comprises a mixture, alloy or conductive oxide of a valve metal preferably selected from Al, W, Ta, Nb, Ti, Zr and Hf. Particularly preferred anodes include niobium, aluminum, tantalum and NbO without limit thereto. An anode consisting essentially of Ta is most preferred.

The dielectric is a non-conductive layer which is not particularly limited herein. The dielectric may be a metal oxide or a ceramic material. A particularly preferred dielectric is a non-conductive oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire is chosen to have low resistivity and to be compatible with the anode material. The anode lead wire may have the same composition as the anode material or may be a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is chosen for optimum electrical properties of the ultimate capacitor.

Throughout the description the terms slurry and dispersion are used interchangeably.

Throughout the description terms such as "alkyl", "aryl", "alkylaryl", "arylalkyl" refer to unsubstituted or substituted groups and if already listed as substituted, such as "alkyl alcohol" refer to groups which are not further substituted or may be further substituted.

Tests

Capacitance Recovery % is the capacitance ratio in percentage of encapsulated parts to capacitance of these parts tested in a liquid electrolyte before cathode layers are applied. ESR is equivalent series resistance of encapsulated capacitors. DCL is leakage current of encapsulated capacitors. BDV is the Breakdown Voltage of the encapsulated capacitors. Vf is the formation voltage applied to anode to form the dielectric layer. Power Cycling Test was done at ambient room temperature, with rated voltage on for 5 seconds, followed by turning off the voltage for 5 seconds. The voltage on/off cycle was repeated for 60,000 times. Capacitance of the parts were tested before and after the power cycling cycles and the % capacitance change is calculated.

EXAMPLES

Prep. Example 1

A dispersion comprising PSSA and PEDOT in a weight ratio of 2 was prepared. A 4 L plastic jar with a cooling jacket was initially charged with 71.76 g of Polystyrene Sulfonic Acid (PSSA) 30% solution in water, 1669 g of deionized (DI) water, 27.27 g of 1% iron(III) sulphate, and 20.57 g of sodium peroxodisulphate. The contents were mixed using a rotor-stator mixing system with perforated stator screen with a round hole size diameter of 1.6 mm. Subsequently, 10.76 g of 3,4-ethylenedioxythiophene (EDOT) was added dropwise. The reaction mixture was sheared continuously with a shear speed of 4200 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 259 S/cm, as tested with DMSO additive, and D50 was 18.1 nm.

Prep. Example 2

A PSSA/PEDOT slurry was prepared in a weight ratio of 3.3. A 4 L plastic jar provided with a cooling jacket was initially charged with 125 g of Polystyrene Sulfonic Acid (PSSA) 30% solution in water, 2531 g of DI water, 28.5 g of 1% iron(III) sulphate, and 21.5 g of sodium peroxodisulphate. The contents were mixed using a rotor-stator mixing system with perforated stator screen with a round hole size diameter of 1.6 mm. Subsequently, 11.25 g of 3,4-ethylenedioxythiophene (EDOT) was added dropwise. The reaction mixture was sheared continuously with a shear speed of 8000 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 210 S/cm, as tested with DMSO additive, and D50 was 15.0 nm.

Prep. Example 3

A PSSA/PEDOT slurry was prepared in a weight ratio of 3.3. A 4 L plastic jar, provided with a cooling jacket, was initially charged with 92.00 g of Polystyrene Sulfonic Acid (PSSA) 30% solution in water (sonicated for 2 hrs before mixing), 1863 g of DI water, 20.98 g of 1% iron(III) sulphate, and 15.82 g of sodium peroxodisulphate. The contents were mixed using a rotor-stator mixing system with perforated stator screen with a round hole size diameter of 1.6 mm. Subsequently, 8.28 g of 3,4-ethylenedioxythiophene (EDOT) was added dropwise. The reaction mixture was sheared continuously with a shear speed of 4200 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 257 S/cm, as tested with DMSO additive, and D50 was 13.8 nm.

Prep. Example 4

A PSSA/PEDOT slurry was prepared in a weight ratio of 5.0. A 4 L plastic jar, provided with a cooling jacket, was initially charged with 54.82 g of Polystyrene Sulfonic Acid (PSSA) 30% solution in water, 1028 g of DI water, 6.80 g of 1% iron(III) sulphate, and 6.29 g of sodium peroxodisulphate. The contents were mixed using a rotor-stator mixing system with perforated stator screen with a round hole size diameter of 1.6 mm. Subsequently, 3.29 g of 3,4-ethylenedioxythiophene (EDOT) was added dropwise. The reaction mixture was sheared continuously with a shear speed of 5000 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 162 S/cm, as tested with DMSO additive, and D50 was 14.7 nm.

Prep. Example 5

A ST/PEDOT slurry was prepared in a weight ratio of 1.5. A 4 L plastic jar provided with a cooling jacket was initially charged with 55.81 g of a polystyrene-sodium polystyrene sulfonate copolymer (ST) 20% solution in water, 1290 g of DI water, 2.98 g of concentrated sulfuric acid, 31.54 g of 1% iron(III) sulphate, and 14.58 g of sodium peroxodisulphate. The contents were mixed using a rotor-stator mixing system with perforated stator screen with a round hole size diameter of 1.6 mm. Subsequently, 7.63 g of 3,4-ethylenedioxythiophene (EDOT) was added dropwise. The reaction mixture was sheared continuously with a shear speed of 6000 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 151 S/cm, as tested with DMSO additive, and D50 was 16.1 nm.

Prep. Example 6

A ST/PEDOT slurry was prepared in a weight ratio of 2.6. A 4 L plastic jar, provided with a cooling jacket, was initially charged with 87.86 g of a polystyrene-sodium polystyrene sulfonate (ST) copolymer 20% solution in water, 1644 g of DI water, 4.70 g of concentrated sulfuric acid, 28.59 g of 1% iron(III) sulphate, and 13.22 g of sodium peroxodisulphate. The contents were mixed using a rotor-stator mixing system with perforated stator screen with a round hole size diameter of 1.6 mm. Subsequently, 6.92 g of 3,4-ethylenedioxythiophene (EDOT) was added dropwise. The reaction mixture was sheared continuously with a shear speed of 6000 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 125 S/cm, as tested with DMSO additive, and D50 was 13.3 nm.

Prep. Example 7

A ST/PEDOT slurry was prepared in a weight ratio of 3.5. A 4L plastic jar, provided with a cooling jacket, was initially charged with 58.31 g of a polystyrene-sodium polystyrene sulfonate copolymer (ST) 20% solution in water, 1025 g of DI water, 3.12 g of concentrated sulfuric acid, 7.12 g of 1% iron(III) sulphate, and 6.59 g of sodium peroxodisulphate. The contents were mixed using a rotor-stator mixing system with perforated stator screen with a round hole size diameter of 1.6 mm. Subsequently, 6.92 g of 3,4-ethylenedioxythiophene (EDOT) was added dropwise. The reaction mixture was sheared continuously with a shear speed of 6000 RPM with the rotor-stator mixing system for an additional 23 hours. The dispersion was treated with cationic and anionic exchange resin and filtered to get PEDOT-PSSA base slurry. The PEDOT-PSSA base slurry was further homogenized with an ultrasonicator. Conductivity of the dispersion was 94 S/cm, as tested with DMSO additive, and D50 was 12.9 nm.

Prep. Example 8

Soluble conductive polymer (S1) was prepared. Commercially available hydroxymethyl 3,4-ethylenedioxythiophene (0.50 g) dissolved in tetrahydrofuran was added to sodium hydride (0.084 g) under nitrogen atmosphere. The resulting mixture was refluxed for one hour, after which 1,4-butanesultone (0.41 g) dissolved in tetrahydrofuran (8 ml) was slowly added. The mixture was stirred for two more hours and then allowed to cool. Acetone (45 ml) was poured into the mixture under vigorous stirring. The suspension was filtered, washed with hot acetone, and concentrated under vacuum to yield pale orange powder of monomer.

0.2 g monomer dissolved in water (5 ml) was added to 0.9 gm iron (III) p-toluenesulfonate hexahydate. The resulting mixture was polymerized under nitrogen for 24 hours at room temperature. The resulting S1 polymer was isolated by precipitating in acetone. The precipitate was collected through vacuum filtration. The collected precipitate was dissolved in DI water and treated with ion exchange resin for 6 hours. The resulting dark blue solution of conductive polymer S1 was isolated through vacuum filtration. The measured electrical conductivity of S1 was 5 S/cm.

Prep. Example 9

To 81 g of Prep. Example 4 was added 9 g of a soluble conductive polymer aqueous solution (S2)

Prep. Example 10

To 100 g of Clevios Knano LV was added 0.4 g of 3-glycidoxypropyltrimethoxysilane and 1.2 g of a polyethyleneglycol diglycidyl ether. The measured D50 was 16.4 nm.

Inventive Example 1 (I-1)

A series of 47 microfarads, 16V tantalum anodes with a specific charge of 133,000 µFV/g were prepared. The tantalum was anodized to form a dielectric on the tantalum anode. The anode thus formed was dipped into Prep. Example 2 for 1 minute and oven dried to remove water. This process was repeated until a sufficient thickness was achieved. A second conductive polymer dispersion containing epoxy and silane compounds was applied to form a subsequent polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 2 (I-2)

A series of Tantalum capacitors were prepared as described in Inventive Example 1, except that the first conductive polymer dispersion used was Prep. Example 4.

Comp. Example 1 (C-1)

A series of Tantalum capacitors were prepared as described in Inventive Example 1, except that the first conductive polymer dispersion used was a commercial Clevios Knano LV sample from Heraeus. Knano LV was reported to have polyanion/EDOT weight ratio of 2.5.

Comp. Example 2 (C-2)

A series of Tantalum capacitors were prepared as described in Inventive Example 1, except that the first conductive polymer dispersion used was Prep. Example 1.

Comp. Example 3 (C-3)

A series of Tantalum capacitors were prepared as described in Inventive Example 1, except that the first conductive polymer dispersion used was Prep. Example 3.

Inventive Example 3 (I-3)

A series of Tantalum capacitors were prepared as described in Inventive Example 1, except that the first conductive polymer dispersion used was Prep. Example 7.

Comp. Example 4 (C-4)

A series of Tantalum capacitors were prepared as described in Inventive Example 1, except that the first conductive polymer dispersion used was Prep. Example 5.

Comp. Example 5 (C-5)

A series of Tantalum capacitors were prepared as described in Inventive Example 1, except that the first conductive polymer dispersion used was Prep. Example 6.

Inventive Example 4 (I-4)

A series of tantalum anodes (33 microfarads, 16V, with a specific charge of 65,000 µFV/g) were prepared. The tantalum was anodized to form a dielectric on the tantalum anode. The anode thus formed was dipped into Prep. Example 4 for 1 minute and oven dried to remove water. This process was repeated until a sufficient thickness was achieved. A second conductive polymer dispersion containing epoxy and silane compounds was applied to form a subsequent polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Comp. Example 6 (C-6)

A series of Tantalum capacitors were prepared as described in Inventive Example 4, except that the first conductive polymer dispersion used was a commercial Clevios Knano LV sample from Heraeus.

Inventive Example 5 (I-5)

A series of 68 microfarads, 16V tantalum anodes with a specific charge of 48,000 µFV/g were prepared. The tantalum was anodized to form a dielectric on the tantalum anode. The anode thus formed was dipped into Prep. Example 2 for 1 minute and oven dried to remove water. This process was repeated until a sufficient thickness was achieved. A second conductive polymer dispersion containing epoxy and silane compounds was applied to form an external polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 6 (I-6)

A series of Tantalum capacitors were prepared as described in Inventive Example 5, except that the first conductive polymer dispersion used was Prep. Example 4.

Comp. Example 7 (C-7)

A series of Tantalum capacitors were prepared as described in Inventive Example 5, except that the first conductive polymer dispersion used was a commercial Clevios Knano LV sample from Heraeus.

Inventive Example 7 (I-7)

A series of tantalum anodes (4.7 microfarads, 63V, with a specific charge of 13,000 µFV/g) were prepared. The tantalum was anodized to form a dielectric on the tantalum anode. The anode thus formed was dipped into Prep. Example 4 for 1 minute and oven dried to remove water. This process was repeated until a sufficient thickness was achieved. A second conductive polymer dispersion containing epoxy and silane compounds was applied to form a subsequent polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Comparative Example 8 (C-8)

A series of Tantalum capacitors were prepared as described in Inventive Example 7, except that the first conductive polymer dispersion used was a commercial Clevios Knano LV sample from Heraeus.

Inventive Example 8 (I-8)

A series of 47 microfarads, 16 V tantalum anodes with a specific charge of 133,000 µFV/g were prepared. The tantalum was anodized to form a dielectric on the tantalum anode. The anode thus formed was dipped into S1, Prep. Example 8, for 1 min and oven dried to remove water. This process was repeated one more time. The anode was then dipped in Prep. Example 2 for 1 minute and oven dried to remove water. This process was repeated until a sufficient thickness was achieved. A commercial conductive polymer dispersion KV2 from Heraeus was then applied to form a subsequent polymer layer. After drying, alternating layers of a diamine salt solution and the commercial conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 9 (I-9)

A series of Tantalum capacitors were prepared as described in Inventive Example 8, except that Prep. Example 2 was replaced by Prep. Example 4.

Comparative Example 9 (C-9)

A series of Tantalum capacitors were prepared as described in Inventive Example 8, except that Prep. Example 2 was replaced by a commercial Clevios Knano LV sample from Heraeus.

Comparative Example 10 (C-10)

A series of Tantalum capacitors were prepared as described in Inventive Example 8, except that Prep. Example 2 was replaced by soluble PEDOT solution S1 from Prep. Example 8.

Inventive Example 10 (I-10)

A series of 47 microfarads, 16V tantalum anodes with a specific charge of 133,000 µFV/g were prepared as described in Inventive Example 1, except that Prep. Example 2 was replaced by Prep. Example 9.

Comparative Example 11 (C-11)

A series of 47 microfarads, 16V tantalum anodes with a specific charge of 133,000 µFV/g were prepared as described in Inventive Example 1, except that Prep. Example 2 was replaced by a soluble conductive polymer aqueous solution (S2).

Inv. Example 11 (I-11)

A series of 33 microfarads, 35V tantalum anodes with a specific charge of 22,000 µFV/g were prepared. The tantalum was anodized to form a dielectric on the tantalum anode. The anodized anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodized anodes. The anode was dipped into a commercial conductive polymer dispersion Clevios Knano LV from Heraeus for 1 min and oven dried to remove water. This process was repeated three more times. The same dipping and drying process was repeated three times with a conductive polymer dispersion from Prep. Example 10. A commercial conductive polymer dispersion KV2 from Heraeus was then applied to form an external polymer layer. After drying, alternating layers of a diamine salt solution and the commercial conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance, ESR, leakage and BDV were measured on packaged parts.

Comp. Example 12 (C-12)

A series of Tantalum capacitors were prepared as described in Inventive Example 13, except that all 7 cycles of first conductive polymer dispersion used a commercial conductive polymer dispersion Clevios Knano LV.

TABLE 1

| Samples | Polyanion | Ratio | D50 (nm) | Powder Charge (µFV/g) | Capacitance Recovery % | ESR (mΩ) |
|---|---|---|---|---|---|---|
| I-1 | PSSA | 3.3 | 15 | 133,000 | 15.5 | 146.0 |
| I-2 | PSSA | 5 | 14.7 | 133,000 | 49.9 | 119.1 |
| C-1 | PSSA | 2.5 | 15.5 | 133,000 | 5.9 | 151.5 |
| C-2 | PSSA | 2 | 18.1 | 133,000 | 3.7 | 251.3 |
| C-3 | PSSA | 3.3 | 13.8 | 133,000 | 16.1 | 169.5 |
| I-3 | ST | 3.5 | 12.9 | 133,000 | 52.1 | 145.9 |
| C-4 | ST | 1.5 | 16.1 | 133,000 | 3.5 | 305.1 |
| C-5 | ST | 2.6 | 13.3 | 133,000 | 20.7 | 193.7 |
| I-7 | PSSA | 5 | 14.7 | 13,000 | 77.9 | 53.7 |
| C-8 | PSSA | 2.5 | 15.5 | 13,000 | 76.8 | 50.5 |

Figure 3:
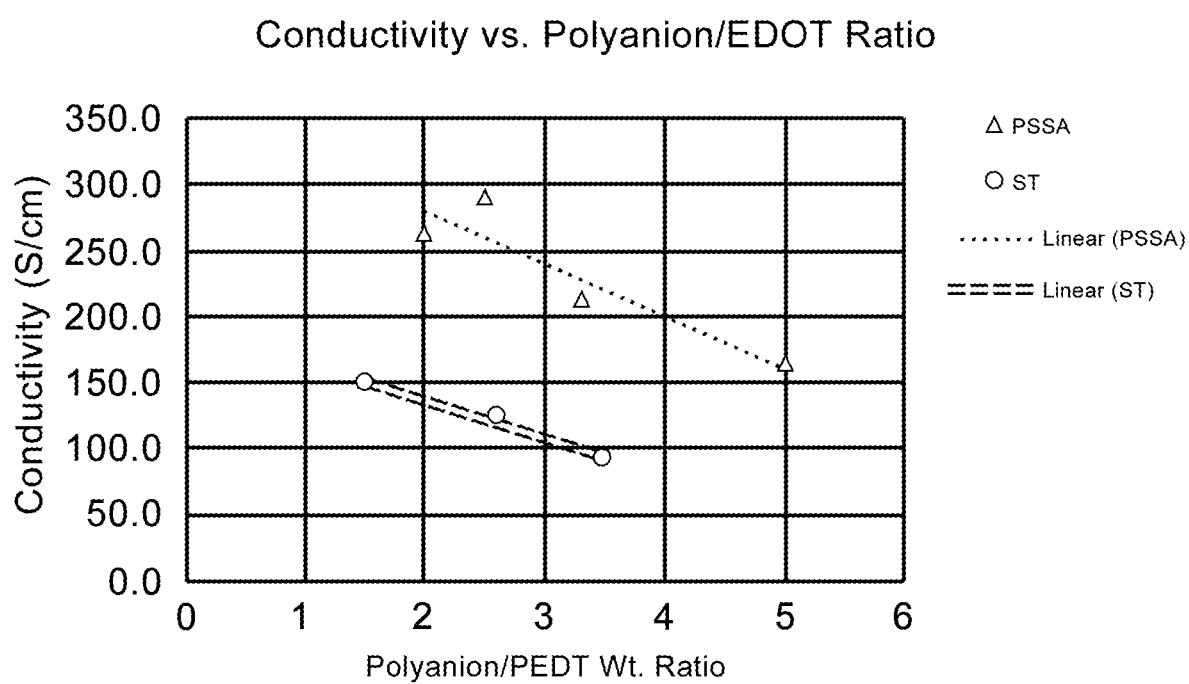
FIG. 3 is a graphical representation of conductivity as a function of the weight ratio of polyanion to conductive polymer.
Figure 4:
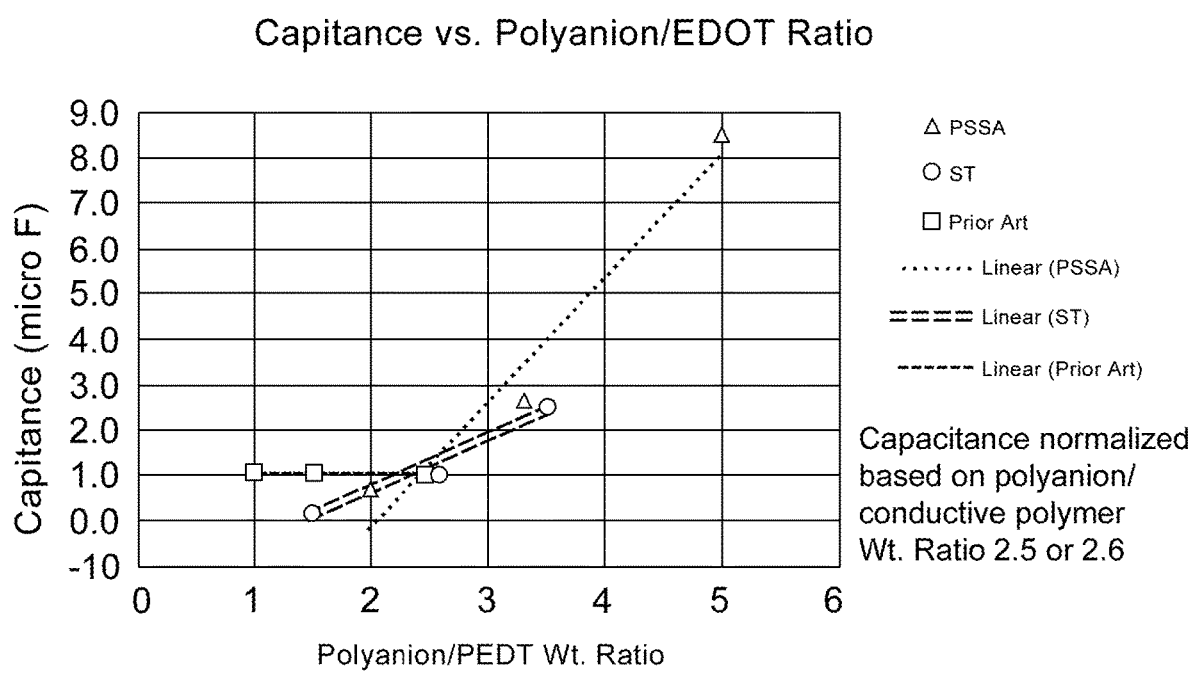
FIG. 4 is a graphical representation of capacitance (normalized) as a function of the weight ratio of polyanion to conductive polymer.
Figure 5:
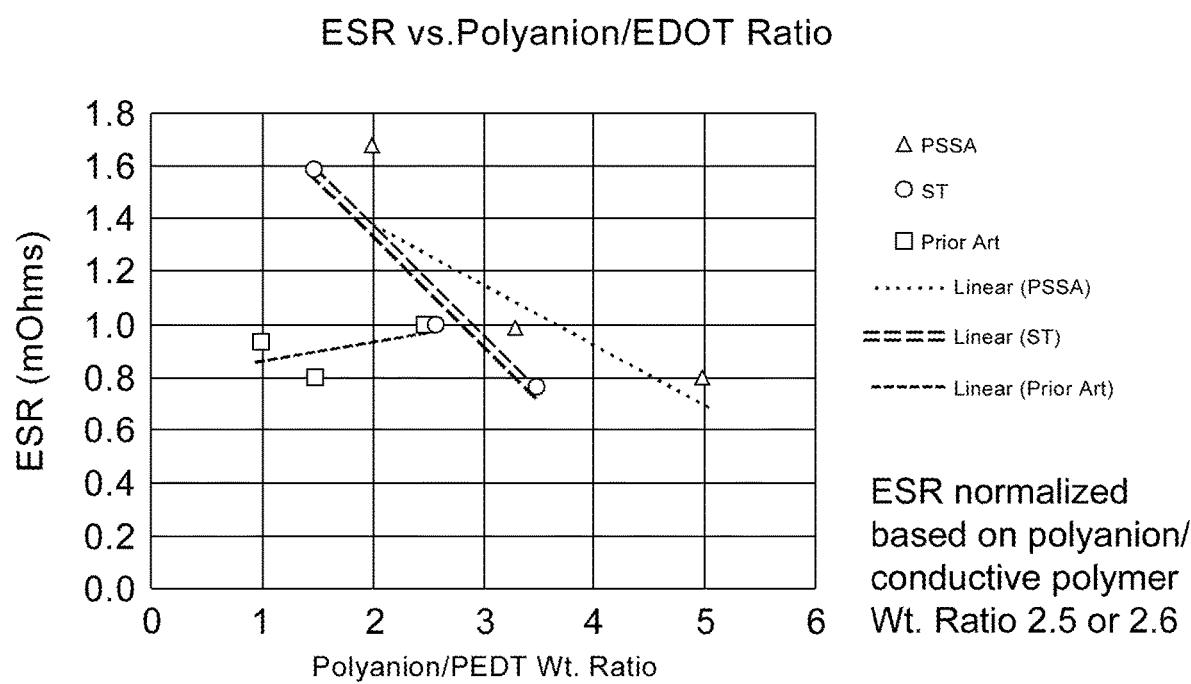
FIG. 5 is a graphical representation of ESR (normalized) as a function of the weight ratio of polyanion to conductive polymer.

In Table 1 Ratio is the weight ratio of polyanion to conductive polymer, D50 is average particle size. Example 1-2, utilizing a higher charge (133,000 µFV/g) part type demonstrated the highest capacitance recovery and lowest ESR even though the slurry had the lowest conductivity for the PSSA samples. Its improvement in capacitance cannot be completely attributed to low average particle size, as Example C-3 had even lower average particle size but the capacitance improvement over Example I-1 was minimum. As illustrated in FIGS. 4 and 5 the correlation between capacitance and ESR vs. polyanion/PEDOT weight ratio is contrary to the expectations in the art as expressed in U.S. Published Pat. Appl. No. 2015/0279503. Also, as illustrated in FIG. 3, as PSSA/PEDOT weight ratio increases conductivity decreases. Better ESR achieved with conductive polymer dispersion having lower conductivity is contradictory to common understanding of ESR-conductivity correlation.

A particular advantage is in capacitance recovery, or Cap recovery, which for a powder charge in excess of 100,000 µFV/g a Cap recovery of at least 65% can be achieved. With a powder charge in excess of 65,000 µFV/a, Cap recovery of at least 70% can be achieved. With a charge in excess of 45,000 µFV/a, Cap recovery of greater 75% can be achieved.

Cap recovery could be higher if in-situ or soluble conductive polymer precursor such as S1 or S2 are applied in case of Table 2 and Table 3 based on result presented in Table 4.

The same trends are observed with conductive polymer dispersion made with polystyrene-polystyrene sulfonic acid (ST) as a dopant. The dispersion with the highest polyanion/PEDOT ratio, Example I-3 was observed to have the best capacitance and ESR, even though the conductivity was only about 94 S/cm. On the contrary, for a lower charge (13,000 μFV/g) powder, Example I-7 showed very little improvement in capacitance and ESR over Example C-8. The results presented in Table 1 demonstrate that a first conductive polymer layer having a weight ratio of polyanion to conductive polymer of greater than 3 and an average particle size of less than 20 nm average diameter (D50) is applied to a high charge capacitor the electrical properties are improved.

TABLE 2

| Samples | Ratio | Capacitance Recovery % | ESR (mΩ) | BDV/Vf |
|---|---|---|---|---|
| I-4 | 5 | 70.4 | 102.9 | 1.90 |
| C-6 | 2.5 | 12.8 | 143.9 | 1.68 |

Table 2 demonstrates the advantages of the invention with another higher charge (65,000 μFV/g) powder and the ability to achieve a breakdown voltage (BDV)/formation voltage (Vf) ratio in excess of 1.

TABLE 3

| Samples | Ratio | Capacitance Recovery % | ESR (mΩ) | Power Cycling Cap Change after 60,000 cycles % |
|---|---|---|---|---|
| I-5 | 3.3 | 74.2 | 31.1 | −9.4% |
| I-6 | 5 | 73.6 | 29.8 | −2.7% |
| C-7 | 2.5 | 70.9 | 33.2 | −28.3% |

Table 3 illustrates the invention for a 48,000 μFV/g charge power. Higher PSSA/PEDOT ratios only showed slightly better ESR and capacitance than C-7. Even though the capacitance benefit was not very significant, power cycling capacitance change showed that higher PSSA/EDOT ratio is advantageous for retaining the initial capacitance. As can be realized from the data provided in Table 3, a power cycling Cap reduction of less than 10% after 60,000 cycles can be achieved and, even more preferably, less than 5%.

TABLE 4

| Samples | Precursor Polymer | First Conductive Polymer | Ratio | Capacitance Recovery % | ESR (mΩ) |
|---|---|---|---|---|---|
| I-8 | S1 | PEDOT-PSSA | 3.3 | 32.6 | 260.0 |
| I-9 | S1 | PEDOT-PSSA | 5 | 59.3 | 152.4 |
| C-9 | S1 | PEDOT-PSSA | 2.5 | 10.2 | 326.3 |
| C-10 | S1 | None | na | 13.4 | 2319.3 |
| I-10 | None | S2/PEDOT-PSSA (1:9) | 5 | 65.3 | 126.8 |
| C-11 | S2 | None | na | 22.4 | 200.4 |
| I-1 | None | PEDOT-PSSA | 3.3 | 15.5 | 146.0 |
| I-2 | None | PEDOT-PSSA | 5 | 49.9 | 119.1 |

The results presented in Table 4 demonstrate that other conductive polymers such as in-situ PEDOT (without polyanion) and soluble PEDOT or other conductive polymers without polyanion can be applied as a precursor conductive polymer before the first slurry and second slurry. In Table 4, two layers of self-doped PEDOT solution (S1) were applied before the first slurry. The highest capacitance and lowest ESR was realized when the self-doped conductive polymer (S1) is followed by a dispersion having a weight ratio of polyanion to conductive polymer of about 5. A synergy is realized when the conductive polymer dispersion with the polyanion/conductive polymer weight ratio greater than 3 is combined with the soluble conductive polymer (S1). Mixing another conductive polymer solution (S2) with the conductive polymer dispersion having a high polyanion to conductive polymer weight ratio also generated similar benefit as shown by Example I-10 and C-11. Reversing the application order by dipping in the conductive polymer dispersion first followed by a conductive polymer solution could also offer similar benefit for capacitance.

TABLE 5

| Examples | D50 (nm) | Capacitance Recovery % | ESR (mΩ) | DCL (μA) | BDV/Vf |
|---|---|---|---|---|---|
| I-11 | 16.4 | 80.1 | 50.7 | 4.0 | 1.01 |
| C-12 | 15.5 | 76.2 | 47.0 | 7.7 | 0.87 |

The results presented in Table 5 illustrate that by adding silane coupling agent and epoxy compounds into the first slurry the capacitance, leakage and breakdown voltage (BDV) can be improved. Alternatively, the additives can be applied as a separate solution from the first slurry and still achieve similar performance enhancement. Without being limited to theory, it is hypothesized that the epoxy compound may form a complex with the conductive polymer dispersions and increased the conductive particle size by having a thicker insulative layer around the conductive core. This was confirmed by increase in particle diameter D50. Despite the particle size increase, the insulative additives had positive effect on impregnation and covering of the anode pores. The silane coupling agent may also increase the adhesion between the first conductive polymer and the dielectric.

The invention has been described with reference to the preferred embodiments without limit thereto. One of skill in the art would realize additional embodiments and improvements which are not specifically set forth herein but which are within the scope of the invention as more specifically set forth in the claims appended hereto.

What is claimed is:

1. An electrolytic capacitor comprising:
    an anode comprising a dielectric thereon wherein said anode comprises a sintered powder wherein said powder has a powder charge of at least 45,000 μFV/g;
    a first conductive polymer layer encasing at least a portion of said dielectric wherein said first conductive polymer comprises a polyanion and a conductive polymer and wherein said polyanion and said conductive polymer are in a first weight ratio of greater than 3 wherein said conductive polymer and said polyanion are conductive particles having an average particle size of no more than 20 nm; and
    further comprising a subsequent conductive polymer layer on said first conductive polymer layer wherein said subsequent conductive polymer layer comprises a second polyanion and a second conductive polymer wherein said second polyanion and said second conductive polymer are in a second weight ratio of less than 3.

2. The electrolytic capacitor of claim 1 wherein said first weight ratio is no more than 10.

3. The electrolytic capacitor of claim 2 wherein said first weight ratio is no more than 6.

4. The electrolytic capacitor of claim 1 having a breakdown voltage/formation voltage ratio of greater than 1.

5. The electrolytic capacitor of claim 1 wherein said anode comprises a valve metal selected from the group consisting of Al, W, Ta, Nb, Ti, Zr and Hf.

6. The electrolytic capacitor of claim 5 wherein said anode comprises a valve metal selected from the group consisting of niobium, aluminum, tantalum and NbO.

7. The electrolytic capacitor of claim 6 wherein said anode comprises tantalum.

8. The electrolytic capacitor of claim 1 wherein said conductive polymer particles comprise an insulative compound.

9. The electrolytic capacitor of claim 8 wherein said insulative compound comprises a silane compound or an epoxy compound.

10. The electrolytic capacitor of claim 8 wherein said insulative compound comprises at least one ionic liquid.

11. The electrolytic capacitor of claim 1 wherein said conductive polymer comprises a conductive polymer selected from the group consisting of polyaniline, polypyrrole, polythiophene and their derivatives.

12. The electrolytic capacitor of claim 11 wherein said conductive polymer is selected from the group consisting of poly(3,4-ethylenedioxythiophene) poly(4-(2,3-dihydrothieno-3,4-b[1,4]dioxin-2-yl)methoxy)-1-butane-sulphonic acid, salt), poly(4-(2,3-dihydrothieno-[3,4-][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4]-b[1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), and poly(3-aniline sulfonate).

13. The electrolytic capacitor of claim 12 wherein said conductive polymer is poly(3,4-ethylenedioxythiophene).

14. The electrolytic capacitor of claim 12 wherein said polyanion comprises at least one of a styrene sulfonic acid group or a styrene sulfonate group.

15. The electrolytic capacitor of claim 1 wherein said polyanion is defined by Formula A:

$A_xB_yC_z$  Formula A wherein:
A is polystyrenesulfonic acid or salt of polystyrenesulfonate;
B and C separately represent polymerized units substituted with a group selected from:

-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^1$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride; and x, y and z, taken together are sufficient to form a polyanion with a molecular weight of at least 100 to no more than 500,000 and y/x is 0.01 to 100; z is 0 to a ratio z/x of no more than 100; y represents 1 to 50% and z represents 0 to 49% of the sum total of x+y+z.

16. The electrolytic capacitor of claim 15 wherein $R^7$ is selected the group consisting of hydrogen and methyl.

17. The electrolytic capacitor of claim 15 wherein $R^{11}$ is selected the group consisting of hydrogen and methyl.

18. The electrolytic capacitor of claim 15 wherein $R^{14}$ is selected the group consisting of hydrogen and methyl.

19. The electrolytic capacitor of claim 15 wherein x represents 50-99%; y represents 10 to 30% and z represents 0 to 20%.

20. The electrolytic capacitor of claim 19 wherein x represents 70-90%.

21. The electrolytic capacitor of claim 1 further comprising a precursor conductive layer prior between said first conductive polymer layer and said dielectric.

22. The electrolytic capacitor of claim 21 wherein said precursor conductive layer does not comprise polyanion.

23. The electrolytic capacitor of claim 21 wherein said precursor conductive layer is crosslinked.

24. The electrolytic capacitor of claim 1 wherein said capacitor has a capacitance recovery of at least of at least 65%.

25. The electrolytic capacitor of claim 24 wherein said capacitor has a capacitance recovery of at least of at least 70%.

26. The electrolytic capacitor of claim 25 wherein said capacitor has a capacitance recovery of at least of at least 75%.

27. The electrolytic capacitor of claim 1 wherein said capacitor has a capacitance reduction of less than 5% after 60,000 cycles of power cycling at rated voltage.

28. The electrolytic capacitor of claim 27 wherein said capacitor has a capacitance reduction of less than 10% after 60,000 cycles of power cycling at rated voltage.

* * * * *